RECORDING AND BIAS MAGNET ASSEMBLY WITH SPACING ELEMENTS FOR TAPE RECORDERS

Original Filed May 6, 1966

INVENTOR
KATSUYA ATSUMI
BY
KARL RATH
ATTORNEY 3,496,305
Patented Feb. 17, 1970

3,496,305

RECORDING AND BIAS MAGNET ASSEMBLY WITH SPACING ELEMENTS FOR TAPE RECORDERS

Katsuya Atsumi, Tokyo, Japan, assignor to Akai Electric Company Limited, Ohta-ku, Tokyo, Japan Application May 6, 1966, Ser. No. 438,202, now Patent No. 3,439,126, dated Apr. 15, 1969, which is a continuation-in-part of application Ser. No. 178,678, Mar. 9, 1962. Divided and this application Apr. 8, 1969, Ser. No. 814,363
Int. Cl. G11b *5/78*
U.S. Cl. 179—100.2 10 Claims

ABSTRACT OF THE DISCLOSURE

In a magnetic tape recorder including a recording magnet having a recording gap, a separate biasing magnet having a biasing gap spaced by a predetermined distance from said recording gap, and a magnetic recording tape moved across said recording gap in contact with said recording magnet, the spacing distance between said magnets is maintained constant by means of a pair of spacing elements being of greater thickness than said tape, and affixed each to one of said magnets on either side of said tape, a tension spring acting to urge said magnets into resilient engagement by way of said elements.

This application is a division of application Ser. No. 438,202, filed on May 6, 1966, entitled Recording and Biasing Head Assembly with Spacing Elements for Magnetic Tape Recorders, now Patent No. 3,439,126, being in turn a continuation-in-part of application Ser. No. 178,-678, filed Mar. 9, 1962, now abandoned.

The present invention relates generally to magnetic recording devices, such as tape recorders, and more particularly to a magnet assembly for recorders of the type comprising a signal recording magnet and a separate high-frequency or the like biasing magnet, as shown and described by the above-mentioned copending application.

Magnetic tape recorders in current use may comprise a single magnet head or core serving for both signal recording and high-frequency biasing. In such a combined arrangement, however, the relative distribution and independent adjustment of the recording and biasing magnetic fields is greatly restricted, for which reason it has been proposed to provide two different and physically separate magnets, to enable a desired relative distribution and adjustment of the respective magnetic fields both in realtion to one another and to magnetic tape, respectively, in such a manner as to ensure optimum recording characteristics and performance of the device.

Experience has shown that, in order to ensure optimum recording performance in tape recorders utilizing separate recording and biasing magnets, especially in connection with mass production or the fabrication of greater numbers of the same type or model of recorder, a predetermined and constant distance between the magnets of all the production units is an absolute prerequisite for the attainment of optimum and uniform recording sensitivity, on the one hand, and high fidelity of the recorded signals, on the other hand.

Accordingly, a major object of the present invention is the provision of a magnet assembly for tape recorders of the referred to type which will ensure the proper relative positioning of both recording and biasing magnets during operation, to result in an optimum recording performance under all operation conditions.

A further object is the provision of spacing means for the recording and biasing magnets of a tape recorder of the referred to type which at the same time acts as a guide for the tape, to improve the stability of the operation and in turn the quality of the recorded and/or play-back signals.

Magnetic tape recorders comprising a recording and biasing magnet assembly of the type described and cooperating with an elongated flexible recording tape usually include an erase magnet, a recording magnet and a high-frequency biasing magnet, the latter being disposed opposite to the recording magnet. Both the recording and biasing magnets consist of a magnetic core having a gap with the gap of the biasing magnet having a relatively greater width in comparison with the width of the gap of the recording magnet and being disposed adjacent to the recording gap, in the manner shown and described in greater detail in the above-mentioned copending application.

With the foregoing objects in view, the invention involves generally the provision of improved spacing means affixed to either of the recording and biasing magnets, to maintain a predetermined distance between the magnets during operation, while at the same time providing a guide for the tape moving in contact with the recording magnet.

The two magnets may have their gaps arranged substantially opposite to one another or relatively displaced laterally. Improved results have been obtained with the magnets being displaced both laterally and angularly relative to one another. Since the tape must be subjected to full and effective pre-magnetization while passing through the leading region of the high-frequency biasing field in advance of the biasing gap as viewed in the tape moving direction, and since, furthermore, the gap of the recording magnet should have a minimum width for the achievement of optimum recording performance, the gap width of the biasing magnet is practically a considerably multiple of the width of the recording gap.

Provision must also be made to temporarily separate the two magnets, in particular during playback, if the recording magnet is used both for recording and playback, since although the biasing magnet is electrically inactive during playback, interfering noises may be induced in the playback magnet by external magnetic fields originating from the transformers and other parts of the recorder or located in the vicinity thereof.

Moreover, since the provision of spacing means determining and maintaining a constant distance between the magnets may interfere with the proper threading and removal of the tape, separation of the magnets must be provided for even where the magnet is used for recording exclusively.

The separation of the magnets may be effected by means of a pivotally mounted support carrying the biasing magnet and being linked with a conventional record-playback control device of the recorder.

The distance between the two magnets during recording must have a definite predetermined value depending upon a number of parameters, such as the ampere turns of the biasing magnet, the type of tape used, the gap widths of the magnets, etc.

The invention, both as to the foregoing and ancilliary objects as well as novel aspects thereof, will be better understood from the following detailed description of a preferred magnet assembly according to the invention, taken in conjunction with the accompanying drawing forming part of this disclosure and in which.

Like reference numerals denote like parts in the different views of the drawing.

Figure 1:
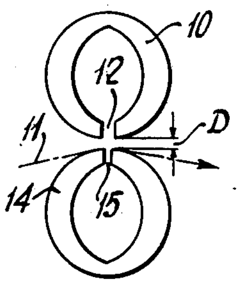
FIG. 1 is a schematic plan view of a known high-frequency biasing and recording magnet assembly forming the subject of the improvements according to the invention, the magnets being shown with their gaps in alignment with one another.
Figure 2:
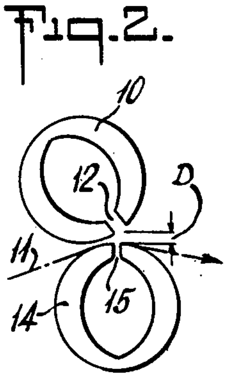
FIG. 2 is a view similar to FIG. 1, wherein the two magnets are shown with their gaps offset laterally and angularly.
Figure 3:
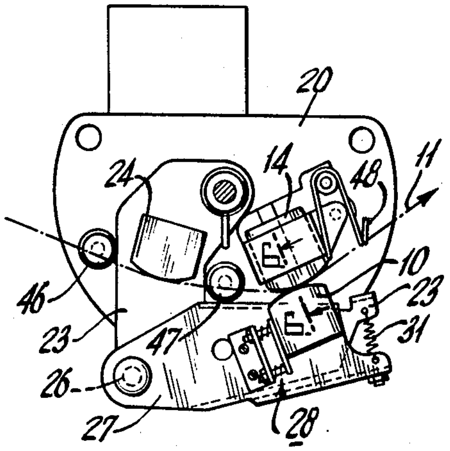
FIG. 3 is a plan view of the complete magnet assembly, shown with the cover of the device removed.
Figure 5:
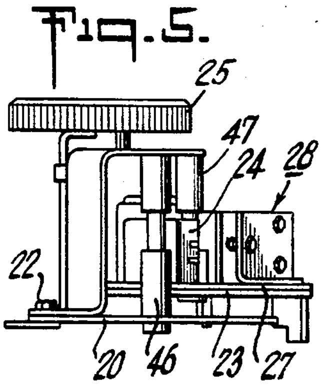
FIG. 5 is a side elevational view of the magnet assembly, as viewed from the left in FIG. 3.
Figure 4:
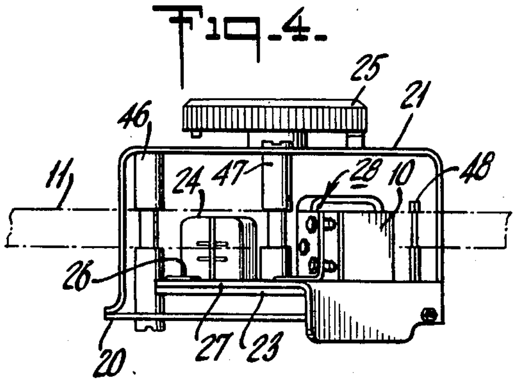
FIG. 4 is a front elevational view of FIG. 3.

Referring to the drawing, FIGS. 1 and 2, the numeral 10 denotes a high-frequency biasing magnet carrying a conventional energizing coil or winding (not shown), 11 indicates an elongated magnetic record carrier, such as a magnetic tape schematically shown the dot-dash line in the drawing with the travelling direction of the tape indicated by the arrow. A magnetic gap 12 is formed in the magnet core 10, whereby, with the magnetizing winding (not shown) being energized by a high-frequency current, a biasing field is established in the vicinity of the gap 12, in a manner well known and understood. The biasing magnet 10 is positioned opposite to and at a predetermined spacing distance D from a recording magnet 14 which may also be of conventional design and has magnetic recording gap 12.

In FIG. 1, both magnets are arranged with their gaps 12 and 15 are substantially in line with one another. Alternatively, the magnets may be off-set to a small degree. The distance D is chosen to be considerably larger than the required minimum for passing the tape 11 between the magnets. For a given recording magnet 14 and number of ampere turns of the biasing magnet 10, the distance D should be maintained at such a value as to ensure optimum sensitivity of the recorder with a minimum of signal distorttion. Distance D depends primarily upon the ampere turns of the biasing magnet and varies, as found experimentally, both with changes of the ampere turns and the width 12 of the gap.

According to a modified arrangement as shown in FIG. 2, the two magnets 10 and 14 are arranged in an asymmetrical relative position in that the biasing magnet 10 is displaced laterally relative to the recording magnet by a small distance, in the direction of the tape movement, and has its gap 12 inclined in the same direction or rearwardly by a small angle relative to the gap 15 of the recroding magnet. As found by practical experiments, the lateral shift of the magnets result in a considerable improvement of the recording characteristics, especially of the overall frequency response and reduction of the usual high-frequency fall-off of high-frequency-biased recorders, although the signal intensity may be slightly decreased thereby. As has also been found, the recording characteristics can be further improved by the relative inclined position of the gaps as shown in FIG. 2.

Figure 6:
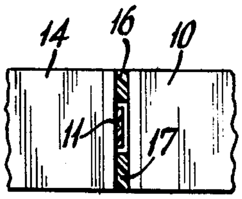
FIG. 6 is a partial elevational view, on an enlarged scale, of the magnet assembly, taken on line 6—6 of FIG. 3 and more clearly showing the improved spacing and tape guiding means according to the invention.

In order to maintain the distance D between the magnets 10 and 14 constant in accordance with the underlying object and purpose of the invention, there are provided a pair of spacing elements 16 and 17 disposed on either side of the tape 11 and within the region of the tape engaging the recording magnet, in the manner more clearly shown in FIG. 6. The spacing elements 16 and 17, which may consist, for instance, of hard rubber, metal or an equivalent material of sufficient hardness, are affixed to either of the magnets, preferably to the biasing magnet, by any suitable means. The space or channel formed between the elements 16 and 17 serves as a guide for the tape 11, movement of which is greatly stabilized thereby, to further improve the recording characteristics of the recorder.

FIGS. 3–7 show, by way of example, a preferred embodiment of a recorder embodying biasing and recording magnet spacing means according to the invention. More specifically, the numeral 20 denotes a base plate fixedly mounted upon the deck (not shown) of the recording machine by any suitable means. Removably mounted, by means of bolts 22, FIG. 5 upon the base 20, is a cover 21 having a dome-shaped configuration and being open at the front. Further mounted, in vertically adjustable manner, on the base 20 is a platform 23 supporting an erase magnet 24 of conventional design, the position of magnet 24 being vertically adjustable by means of a control knob 25. In the drawing, the erase magnet is shown in its lowermost position in the drawing. The purpose of the vertical adjustment of the magnet is to enable the use of the recorder under different operating conditions, such as for multitrack monaural, binaural, etc. recording or playback.

Platform 23 supports a mounting plate 27 pivoted thereto at 26 for adjustment in a horizontal plane. Mounted upon the plate 27 is the biasing magnet 10 positioned by means of a fine adjusting mechanism 28, as more clearly described in the copending application. The recording magnet 14 is mounted upon the base 20 either in line or relatively displaced to the biasing magnet 10, as shown by FIGS. 1 and 2, respectively. Since the distance D is practically very small, the two magnets in FIG. 3 appear as engaging each other, but are spaced at the predetermined distance determined by the thickness of the spacing elements 16 and 17, as shown by FIG. 6. A tension spring 31 connected between the mounting plate 27, on the one hand, and to the platform 23, on the other hand, serves to resiliently urge the biasing magnet against the recording magnet via the spacers 16 and 17.

Numerals 46, 47 and 48 designate auxiliary guides, cooperating with the spacer elements 16 and 17 in properly guiding and stabilizing the tape movement in the manner pointed out hereinbefore. By means of the mechanism 28 the biasing magnet 10 can be adjusted laterally and/or angularly relative to the recording magnet 14 in the manner described in the copending application, while the spacer elements 16 and 17 in cooperation with the spring 31 act to maintain a constant spacing distance D between the magnets.

Figure 7:
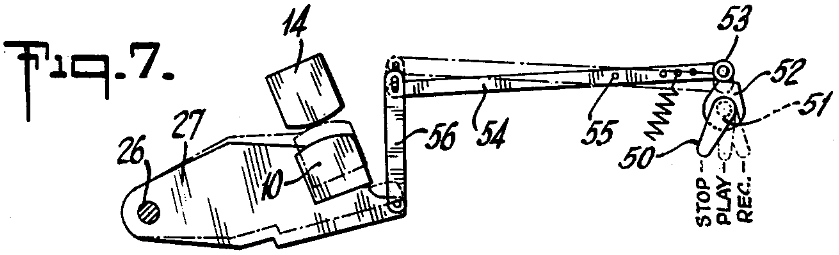
FIG. 7 is a diagrammatic view of a linkage arrangement for the separation of the magnets during threading and/or playback.

Referring to FIG. 7, a conventional record-playback control knob 50 is fixedly attached to a stem 51 which is rotatively mounted in the base of the recording machine and mechanically linked to a conventional tape feeding mechanism. Knob 50 has three operating positions marked "STOP," "PLAY" and "REC," the latter representing the recording position of the device. A cam 52 fast upon the knob 50 is in pressure engagement with a follower roller 53 rotatively mounted upon one end of a double lever 54. Lever 54 is pivoted at an intermediate point 55 to the base of the machine and linked, through a lost-motion connection at its opposite end, to a link 56 being in turn connected with the pivoted member 27.

When the knob 50 is adjusted from its operating positions "PLAY" or "REC" to its "STOP" position, as shown in full lines in the drawing, the follower 53 is displaced upwardly from the dot-dash position to the full line position by the action of the cam 52. As a consequence, the tape is arrested and the linked end of the lever 54 is moved to its lowermost position, as shown in full lines in the drawing. This rotation of the lever 54 about the pivot 55 is transmitted through the link 65 to the member 27, whereby to displace the biasing magnet 10 in a direction away from the recording magnet 14. When the knob 50 is moved to the "PLAY" position, the follower 53 remains in contact with the straight portion of the cam 52 so that both magnets 10 and 14 remain in the separate position.

On the other hand, when the knob 50 is moved to the "REC" position, the roller 53 being again displaced by the cam results in a movement of lever 54 in the reverse direction, whereby to return the biasing magnet to its operative position in contact with the recording magnet via the spacing elements 16 and 17.

In the foregoing the invention has been described in reference to a specific exemplary device. It will be understood, however, that variations and modifications may be made in accordance with the broader scope and spirit of the invention. The specification and drawing are accordingly to be regarded in an illustrative rather than in a restrictive sense.

I claim:

1. In a magnetic recording device of the type including a recording magnet having a recording gap, an elongated magnetic record carrier arranged to move across said gap and in contact with a predetermined surface area of said magnet, and a separate biasing magnet having a biasing gap, said magnets being arranged with their gaps in spaced predetermined relative operating position; the improvement consisting in the provision of means to maintain a constant spacing distance between said magnets comprising a pair of spacing elements of predetermined thickness in excess of the thickness of said carrier and affixed each to one of said magnets within said area and on either side of said carrier, and means to urge said magnets into resilient engagement with one another by way of said elements.

2. In a magnetic recording device as claimed in claim 1, wherein said spacing elements are both affixed to said biasing magnet.

3. In a magnetic recording device as claimed in claim 1, wherein said record carrier consists of a magnetic tape with said elements providing a guide channel therefor.

4. In a magnetic recording device as claimed in claim 1, wherein said biasing gap has a width in excess of and is aligned with said recording gap.

5. In a magnetic recording device as claimed in claim 1, wherein said biasing gap has a width in excess of and is laterally displaced, in the direction opposite to the tape moving direction, relative to said recording gap.

6. In a magnetic recording device as claimed in claim 1, wherein said biasing gap has a width in excess of and is laterally displaced and angularly inclined, in the direction opposite to the tape moving direction, relative to said recording gap.

7. In a magnetic recording device as claimed in claim 1, wherein said spacing elements consist of hard rubber.

8. In a magnetic recording device as claimed in claim 1, wherein said spacing elements consist of metal.

9. A magnetic recording device of the type including (1) a recording magnet having a recording gap, (2) an elongated magnetic record carrier arranged to move across said gap in contact with a predetermined surface area of said magnet, (3) a separate biasing magnet having a biasing gap, and (4) means to maintain said biasing gap in predetermined relative spaced position to said recording gap, comprising (a) a first stationary support carrying one of said magnets, (b) a second support relatively movably mounted upon said first support and carrying the other of said magnets, (c) a pair of spacing elements of predetermined thickness in excess of the thickness of said carrier and affixed each to one of said magnets within said area and on either side of said carrier, and (d) tension spring means intervening between said supports, to urge said magnets into resilient engagement with one another by way of said elements.

10. In a recording device as claimed in claim 9, wherein said record carrier consists of a magnetic tape passing between said elements acting as a guide therefor.

References Cited

FOREIGN PATENTS 173,869 2/1953 Austria.

BERNARD KONICK, Primary Examiner

ROBERT S. TUPPER, Assistant Examiner